United States Patent [19]

DeGraffenreid

[11] Patent Number: 4,613,438
[45] Date of Patent: Sep. 23, 1986

[54] TRIANGULAR FILTER CARTRIDGE AND APPARATUS

[76] Inventor: Howard T. DeGraffenreid, P.O. Box 261, Inola, Okla. 74036

[21] Appl. No.: 632,451

[22] Filed: Jul. 19, 1984

[51] Int. Cl.$^4$ ............................................. B01D 29/32
[52] U.S. Cl. ................... 210/323.1; 210/346; 210/486; 55/529
[58] Field of Search .................... 210/323.2, 331, 345, 210/346, 347, 486; 55/482, 521, 529

[56] References Cited

U.S. PATENT DOCUMENTS

| | | | |
|---|---|---|---|
| 2,210,213 | 8/1940 | Long ................... | 210/131 |
| 2,312,999 | 3/1943 | De Langen ............. | 210/323.2 |
| 2,587,903 | 3/1952 | Rood ..................... | 210/140 |
| 2,765,084 | 10/1956 | Tursky ................... | 210/323.2 |
| 2,919,030 | 12/1959 | Grant et al. ............. | 210/488 |
| 3,223,244 | 12/1965 | Topol et al. ............. | 210/247 |
| 3,241,679 | 3/1966 | Walter ................... | 210/444 |
| 3,291,310 | 12/1966 | Marvel ................... | 210/169 |
| 3,330,101 | 7/1967 | Murphy, Jr. ............. | 55/529 |
| 3,556,300 | 1/1971 | Codo ..................... | 210/232 |
| 3,662,895 | 5/1972 | Trffnell et al. .......... | 210/439 |
| 3,853,509 | 12/1974 | Leliaert ................... | 55/529 |
| 3,880,757 | 4/1975 | Thomason ............. | 210/167 |
| 4,057,502 | 11/1977 | Crumrine et al. ........ | 210/440 |
| 4,058,463 | 11/1977 | Bartik ................... | 210/317 |
| 4,065,392 | 12/1977 | Gammon ................ | 210/282 |

FOREIGN PATENT DOCUMENTS

| | | | |
|---|---|---|---|
| 1172099 | 10/1958 | France ................... | 210/323.2 |
| 626699 | 10/1961 | Italy ..................... | 210/323.2 |
| 117395 | 7/1918 | United Kingdom ....... | 210/323.2 |

*Primary Examiner*—Peter A. Hruskoci
*Assistant Examiner*—Wanda L. Millard
*Attorney, Agent, or Firm*—Albert L. Jeffers; John F. Hoffman

[57] ABSTRACT

An improved triangular filter cartridge and apparatus is provided comprising a generally cylindrical vessel having a plurality of generally triangularly shaped filter cartridges disposed therein. Each triangular filter cartridge has one of its substantially flat sides slightly spaced apart from and in direct facing relationship with the inner surface of the vessel, whereby a greater number of triangular filter cartridges can be compactly disposed within said vessel to increase the filtration capacity thereof.

12 Claims, 9 Drawing Figures

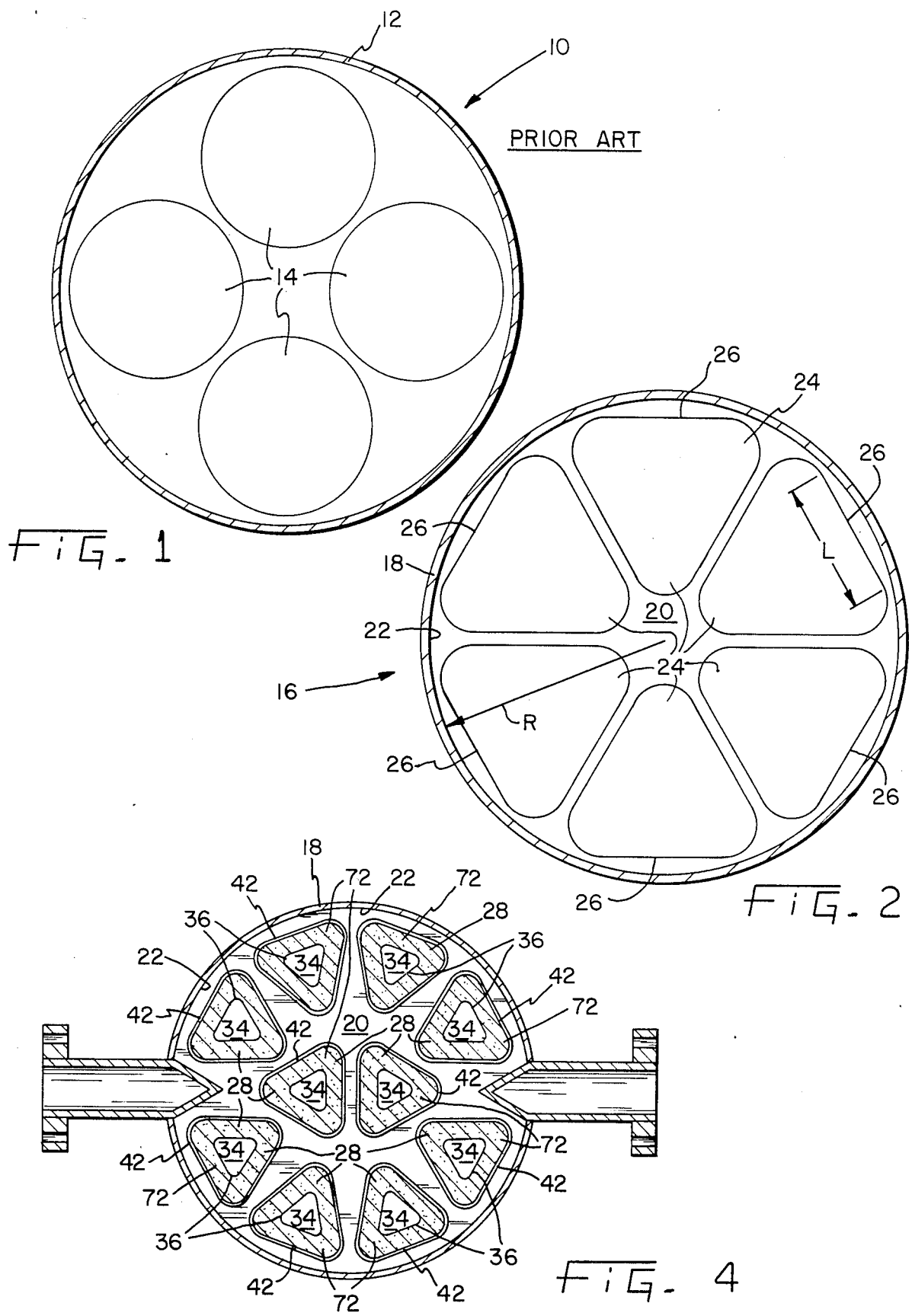

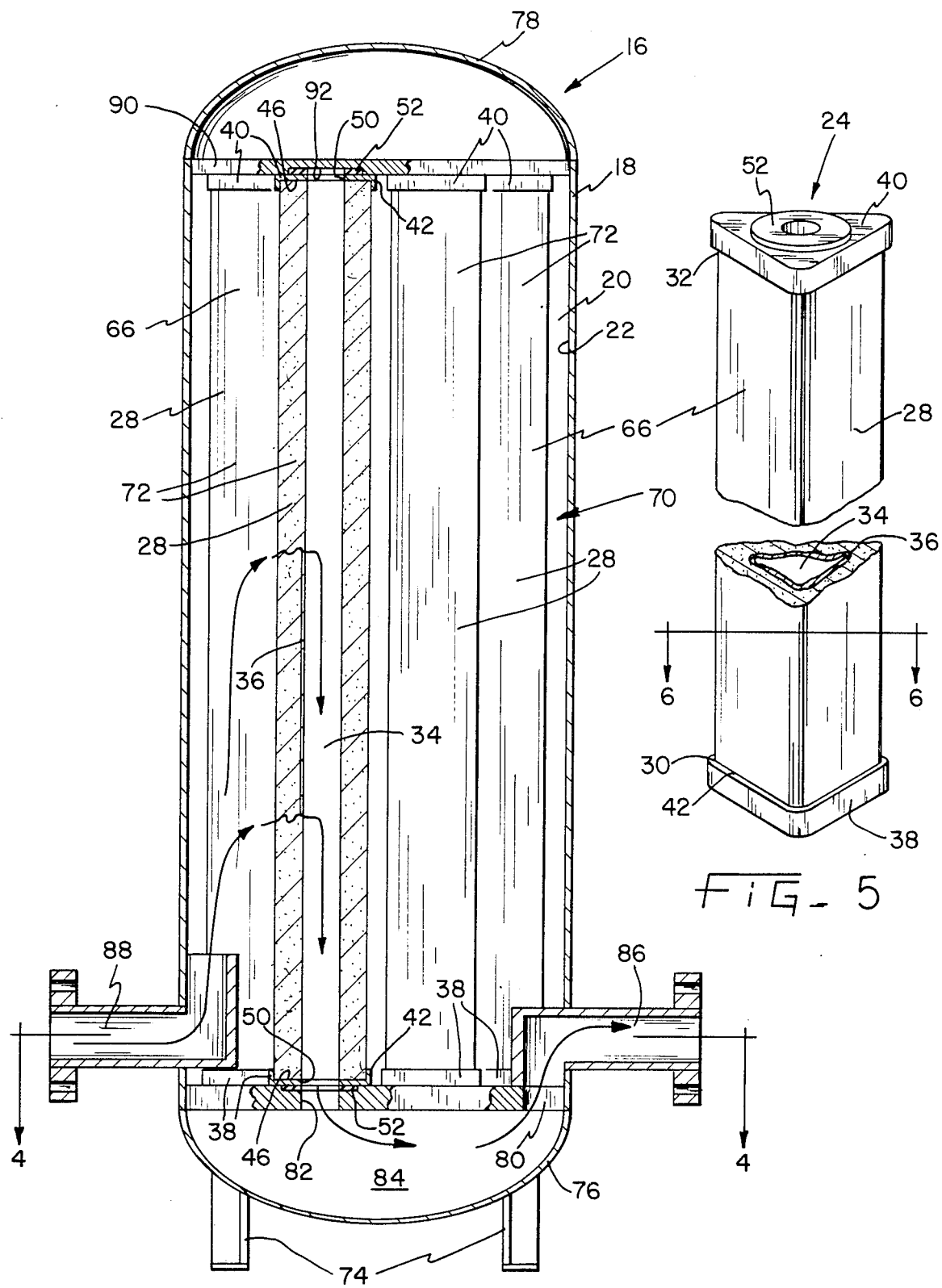

TRIANGULAR FILTER CARTRIDGE AND APPARATUS

BACKGROUND OF THE INVENTION

This invention pertains to a fluid filter apparatus, and more particularly to an improved fluid filter apparatus including a generally cylindrically shaped vessel having a plurality of generally triangular shaped filter cartridges compactly disposed therein to increase filtration capacity.

Typically, filtration apparatuses generally comprise a filter vessel of generally cylindrical shape containing a number of replaceable filter cartridges for filtering contaminants from a fluid. A typical filter cartridge comprises a filter medium or media, a support member for the medium, and an end cap on each end of the medium. These filter vessels are generally cylindrical shaped for ease of manufacturing, and a desired objective is to have as many replaceable filter cartridges as possible disposed therein to increase the filtration capacity of a vessel of given diameter.

Currently, most filter cartridges are also generally circular in shape, which has been dictated by the shape of the support member for the filter medium. Support members are required not only to withstand forces imposed by a differential fluid pressure transversely applied across the filter cartridges, but also the forces longitudinally applied by the device or mechanism for securely holding the filter cartridges in the vessel. Generally, these support members are in the form of a perforated tube, and are frequently assisted in providing support by a standpipe longitudinally disposed therein. The support member must be sufficiently strong to withstand the above-described transverse and longitudinal forces, and previously the most economical shape for a support member has been cylindrical, thereby resulting in the filter cartridges likewise being of generally cylindrical shape. Thus, if a user desires a filter vessel of specified diameter, then the number of filter cartridges is dictated thereby. Further, if a desired number of filter cartridges is specified so as to provide a desired filtration capacity, then the diameter of the filter vessel is dictated by the quantity and the overall diameter of the filter cartridges.

Clearly, one of the disadvantages of the above prior art filter apparatuses is that a filter vessel of specified diameter and specified filtration capacity may not be of sufficient size to house the requisite number of filter cartridges to provide the desired filtration capacity. For example, a typical filter vessel is one having a diameter of sixteen inches, and a typical filter cartridge is one having a diameter of six inches, and only four such filter cartridges can be suitably placed in such a vessel. If the four filtration cartridges are not adequate to provide the desired filtration capacity of such a size vessel, the apparatus will be unsatisfactory to the user.

Another disadvantage with the above filter apparatuses concerns the generally cylindrically shaped and thin-walled support members, which generally have low collapsing pressure thresholds, and therefore easily collapse under applied external pressures that exceed their thresholds. Circumventing this disadvantage requires the support member to be constructed with a thicker wall, thereby possibly necessitating decreasing the depth or thickness of the filter medium and its filtration capacity.

In view of the above, there clearly exists a need for filter cartridges having shapes that permit a greater number thereof to be housed within a filter vessel of specified diameter to provide a desired filtration capacity.

SUMMARY OF THE INVENTION

The present invention overcomes the disadvantages of the earlier described prior art fluid filter apparatuses by providing in one embodiment thereof an improved fluid filter apparatus comprising a plurality of generally triangularly shaped filter cartridges compactly disposed within a filter vessel.

By constructing the filter cartridges with a generally triangularly shaped outer peripheral surface defining three substantially flat sides, and disposing them within the cylindrical vessel such that one of the sides is slightly spaced apart from the vessel inner surface and in direct facing relationship therewith, more such filter cartridges can be disposed within the cylindrical vessel than circularly shaped cartridges, wherein the outer peripheral surface area of one circular cartridge is the same as that for one triangular cartridge, thereby increasing the filtration capacity of a filter vessel of specified diameter. Moreover, since more triangularly shaped filter cartridges can be housed within a cylindrical filter vessel of specified diameter, a more uniform flow distribution of fluid through the filter cartridges is realized.

Another advantage provided by the present invention is that of constructing the structural support member in a generally triangular shape similar to that of the filter medium. The collapsing pressure threshold of a generally triangularly shaped support member is greater than that of a cylindrically shaped support member, and therefore can withstand greater external forces. Furthermore, because of the higher collapsing pressure thresholds, triangularly shaped support members can be constructed with a relatively thinner wall than cylindrically shaped support members, thereby maximizing the depth or thickness of the filter medium and, accordingly, its filtration capacity.

In one form of the invention there is provided in a filter apparatus including a vessel having a generally cylindrical inner surface, an inlet for receiving a fluid to be filtered, and an outlet for discharging a filtered fluid, a filter cartridge assembly for filtering a fluid and comprising a plurality of individually replaceable filter cartridges longitudinally disposed in the filter vessel. Each replaceable filter cartridge comprises an elongate permeable filter medium having oppositely disposed ends and a passage disposed therein, wherein the passage opens at one of the ends and communicates with the vessel outlet. A porous support member is provided in supporting engagement against the filter medium, and an end cap is sealingly disposed between the filter medium and outlet, and has an opening communicating between the passage and outlet. Each permeable filter medium has a generally triangularly shaped outer peripheral surface defining three substantially flat sides with one of the sides being slightly spaced apart from and in direct facing relationship with the vessel inner surface.

In another form of the invention there is provided a filter cartridge for filtering contaminants from a fluid comprising a permeable filter medium adapted for filtering contaminants from a fluid and having oppositely disposed ends and a passage disposed therein, wherein the passage opens at one of the ends. A porous support member is provided in supporting engagement with the filter medium and is adapted to have a fluid pass therethrough. An end cap is sealingly secured to the one end of the filter medium and has an opening therein communicating with the passage. The permeable filter medium has a polygonally shaped outer peripheral surface defining at least three substantially flat sides disposed at acute angles to each other, whereby a fluid to be filtered passes through the filter medium and support member and through the passage and out the end cap opening.

It is an object of the present invention to provide an improved filter apparatus including a vessel and a plurality of generally triangularly shaped filter cartridges compactly disposed therein.

Another object of the present invention is to provide an improved fluid filter apparatus including a vessel having a generally cylindrically shaped inner surface and a plurality of generally triangularly shaped filter cartridges, wherein each filter cartridge has one of its sides slightly spaced apart from and in direct facing relationship with the vessel inner surface to provide a greater number of filter cartridges in a vessel of specified diameter than cylindrically shaped cartridges, wherein each cylindrical cartridge has the same outer peripheral surface area as each triangular cartridge.

Yet another object of the present invention is to provide a fluid filter apparatus of a specified size with increased filtration capacity.

A further object of the present invention is to provide a replaceable filtration cartridge of generally triangular shape.

A still further object of the present invention is to provide a plurality of generally triangularly shaped filter cartridges in a generally cylindrically shaped vessel in a space-saving arrangement.

Further objects of the present invention will appear as the description proceeds.

BRIEF DESCRIPTION OF THE DRAWINGS

The above-mentioned and other features and objects of this invention and the manner of attaining them, will become more apparent and the invention itself will be better understood by reference to the following description of an embodiment of the invention taken in conjunction with the accompanying drawings, wherein:

FIG. 1 is a transverse cross-sectional view of a prior art filter apparatus;

FIG. 2 is a transverse cross-sectional view of one embodiment of the present invention;

FIG. 3 is an elevational broken-away and partially sectioned view of a second embodiment of the present invention;

FIG. 4 is a sectional view of FIG. 3 taken along line 4—4 and viewed in the direction of the arrows;

FIG. 5 is a broken-away perspective view of a filter cartridge of the present invention;

DESCRIPTION OF A PREFERRED EMBODIMENT

Figure 6:
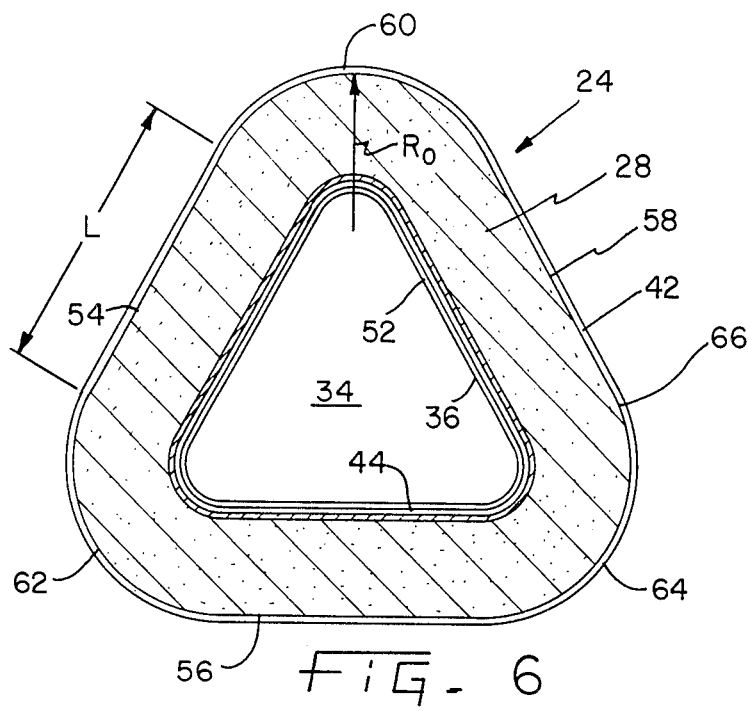
FIG. 6 is a sectional view of FIG. 5 taken along line 6—6 and viewed in the direction of the arrows.

Referring initially to FIG. 1, a prior art filter apparatus 10 is illustrated comprising vessel 12 and four filter cartridges 14, and in a typical embodiment vessel 12 has a 16 inch inner diameter and filter cartridges 14 have a 6 inch diameter. As can be clearly seen, only four cylindrically shaped filter cartridges 14 can be suitably disposed in vessel 12, thereby limiting the filtration capacity thereof. In comparison, FIG. 2 illustrates a filter apparatus 16 according to the present invention comprising cylindrically shaped vessel 18 having an interior space 20 and a generally cylindrically shaped inner surface 22. In this illustration, vessel 18 also has a 16 inch inner diameter and contains 6 filter cartridges 24 according to the present invention, wherein each filter cartridge 24 has approximately the same outer peripheral surface area as each filter cartridge 14 in FIG. 1. Filter cartridges 24 are generally triangular in shape with one of their generally flat sides 26 slightly spaced apart from and in direct facing relationship with inner surface 22 and the opposite corner facing inwardly toward the longitudinal axis of vessel 18. Because of this geometric arrangement of filter cartridges 24 in vessel 18, a greater number are compactly disposed therein resulting in a greater filtration capacity for apparatus 16. Where the available space in which filter apparatus 16 is limited, thereby restricting the diameter size of vessel 18, the triangularly shaped filter cartridges 24 will provide a greater filtration capacity for that size vessel 18.

Figure 7:
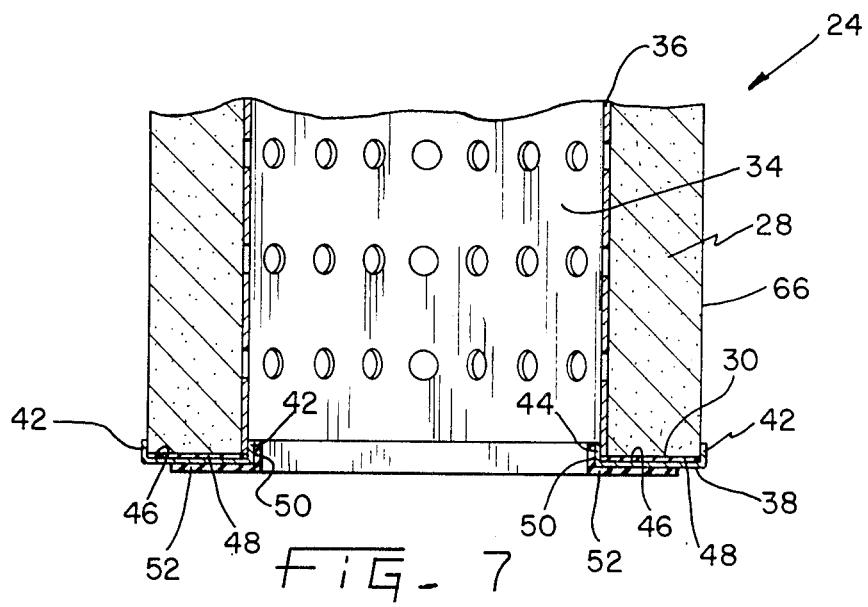
FIG. 7 is an enlarged fragmentary and cross-sectional view of one end of the filter cartridge in FIG. 5.

Referring now to FIGS. 5, 6, and 7, generally triangularly shaped filter cartridge 24 is elongate and comprises permeable filter medium 28 having oppositely disposed ends 30, 32 and passage 34 longitudinally extending therebetween. A support member such as thin-walled perforated support member 36 is disposed within passage 34 in supporting engagement against filter medium 28. A pair of generally triangularly shaped end caps 38, 40 are provided to be disposed on ends 30, 32 of filter medium 28. End caps 38, 40 are similar in structure, and only a description of end cap 38 follows. End cap 38 includes a generally triangularly shaped outer flange 42 and a similar generally triangularly shaped inner flange 44 extending outwardly therefrom and defining therebetween flat surface 46. Flanges 42, 44 are spaced apart a distance equal to the thickness of filter medium 28 and support member 36, and a coating of a suitable adhesive 48 is applied between flanges 42, 44 on flat surface 46. The ends of filter medium 28 and support member 36 are securely positioned between flanges 42, 44 and against flat surface 46 to be sealingly bonded thereto to prevent passage or leakage of a fluid therebetween. End cap 38, as well as end cap 40, has a generally triangularly shaped opening 50 with a suitable gasket 52 secured therein. As described and illustrated, filter medium 28 has three substantially flat sides 54, 56, 58 joined together by rounded corners comprising curved or arcuate portions 60, 62, 64 defining triangularly shaped outer peripheral surface 66.

Filter cartridge 24 having support member 36 disposed within passage 34 of filter medium 28 is designed for outside-in flow of a fluid to be filtered, wherein the fluid first passes through outer peripheral surface 66 and through the body of filter medium 28 into passage 34. With this type of outside-in flow pattern, support member 36 is disposed within passage 34 to prevent collapse of filter medium 28 due to the differential fluid pressure applied thereto, along with withstanding longitudinal forces applied primarily by the device or mechanism for securing cartridge 24 in vessel 18.

For the inside-out flow patterns, wherein the fluid to be filtered is first introduced through passage 34 for filtering through filter medium 28, support member 36 is disposed in supporting engagement against outer peripheral surface 66 to counteract the differential fluid pressure applied thereto.

Filter medium 28 can be made of any suitable permeable material, including a moldable resin material having sufficient density and capable of self-support without need of support member 36 and end caps 38,40 thereby reducing manufacturing costs. Further, filter medium 28 can be of any desired shape such as pleated, non-pleated, and a solid depth type, and multiple types of filter mediums may be used in a single filter cartridge 24. Also, sides 54,56,58 can be formed having a convex contour, rather than being flat, thereby increasing the collapse strength of medium 28. As to the particular type of fluid to be filtered, the present invention contemplates filtering any type of fluid having any type or size of foreign particulate, or other contaminants whether solid or fluid.

End caps 38, 40 generally assist support member 36 in giving structural integrity to filter medium 28, and may be made of any suitable type of material, such as various plastic materials, for example, epoxy, polyesters, plastisol, metal, and fibrous cellulosic materials. Further, gaskets 52 can be made of any suitable material for use with a filter cartridge 24.

In constructing the shape of filter cartridges 24 to compactly fit within vessel 18 as illustrated in FIG. 2, the following relationship exists between the inner radius R (FIG. 2) of vessel 18 and the length L (FIG. 6) of sides 54, 56, 58 and the radius of curvature $R_o$ of curved portions 60, 62, 64:

$$2 \pi R = 2 \pi R_o + 3L$$

By determining filter cartridges 24 according to the above relationship, an arrangement of filter cartridges 24 can be disposed in vessel 18 as indicated in FIG. 2. The formula is used to determine the length L of sides 54,56,58 of a delta-designed cartridge, such as cartridge 24, with relation to a standard circular cartridge, such as a 6" outer diameter circular cartridge.

Referring now to FIGS. 3 and 4, filter apparatus 16 is illustrated with vessel 18 housing filter cartridge assembly 70 comprising a plurality of filter cartridges 72, which are generally triangular in shape and smaller in transverse cross-section than filter cartridges 24 to illustrate a different arrangement from that in FIG. 2. Filter cartridges 72 are identical to filter cartridges 24 except for the difference in size. Vessel 18 includes four supports 74, only two of which are illustrated, with concavely shaped ends 76, 78. Vessel 18 further includes deck plate 80 secured in end 76 and having a plurality of openings 82 disposed therein to allow communication between outlet chamber 84 and interior space 20, and outlet chamber 84 includes outlet 86 for discharging a filtered fluid. Inlet 88 in vessel 18 permits a fluid to be filtered to be received therethrough into interior space 20. A like plurality of filter cartridges 72 are disposed in vessel 18 with their respective gaskets 52 sealingly disposed in respective openings 82, and with respective end caps 38 sealingly disposed against deck plate 80. Cartridges 72 are secured in an upright manner by a hold-down plate 90 secured in vessel end 78, and closed openings 92 in hold-down plate 90 have gaskets 52 of the upper ends of cartridges 72 sealingly disposed therein and with end caps 40 sealingly disposed against the bottom surface of hold down plate 90. Other methods are available for securing cartridges 72 in vessel 18, and one such method is described in U.S. Pat. No. 4,320,005 of the present applicant, which patent is incorporated herein by reference.

As illustrated in FIG. 4, since cartridges 72 are not constructed according to the above formula so as to be arranged in vessel 18 as illustrated in FIG. 2, the inwardly disposed vertices of cartridges 72 form a generally circular space which can have other cartridges 72 disposed therein. As with the embodiment in FIG. 2, one of the flat sides of each cartridge 72 is slightly spaced apart from and in direct facing relationship with inner surface 22 of vessel 18 to provide maximum utilization of available space therein.

In operation, a fluid to be filtered is urged through inlet 88 into interior space 20 and passes through filter mediums 28, which filters contaminants therefrom. The filtered fluid then passes through perforated support members 36 into passages 34 for downward travel therethrough through end cap openings 50 and openings 82 into outlet chamber 84. Openings 82 are also generally triangularly shaped to permit proper fit and orientation of triangularly shaped gaskets 52. The filtered fluid then is drawn from outlet chamber 84 through outlet 86.

The reverse filtration may also be used with support members 36 disposed against respective outer peripheral surfaces 66 of cartridges 72, wherein the fluid to be filtered will follow the reverse path into outlet 86, outlet chamber 84 and into passages 34 for filtration through filter mediums 28. After passage through respective support members 36, the filtered fluid is discharged from vessel 18 through inlet 88.

Figures 8, 9:
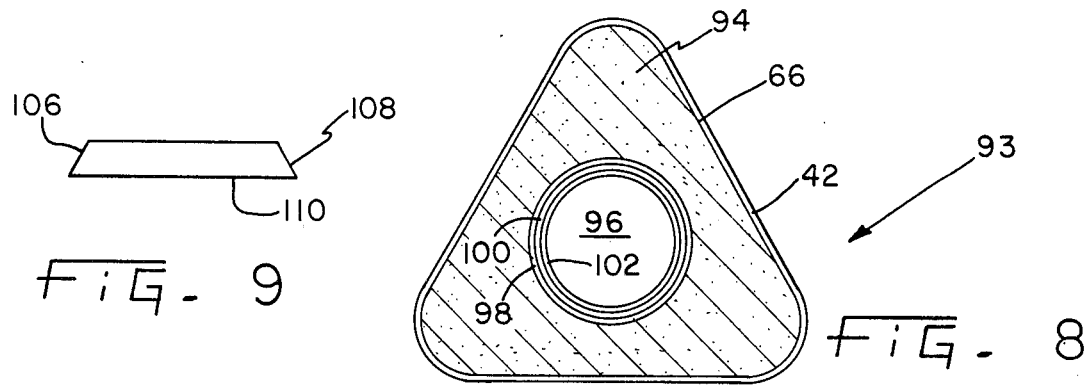
FIG. 8 is a transverse cross-sectional view of a modified filter cartridge of the present invention.
FIG. 9 is a transverse cross-sectional view of another modified filter cartridge of the present invention.

Referring to FIG. 8, a modification of filter cartridge 24, or filter cartridge 72, is illustrated wherein a filter medium 94 has a generally triangularly shaped outer peripheral surface and a generally circularly shaped passage 96 disposed between its opposite ends. A generally circular perforated support member 98 is disposed with passage 96 in supporting engagement against the inner surface of filter medium 94. The end cap for this modification includes a generally triangularly shaped outer flange 42 and a generally circularly shaped inner flange 100 with a generally circularly shaped gasket 102 disposed therein. Again, filter medium 94 and support member 98 are sealingly secured between flanges 42 and 100 to prevent leakage or passage of a fluid therebetween. Further, for an inside-outside flow pattern, filter cartridge 93 will have a generally triangularly shaped support member 36 disposed on its outer peripheral surface.

The present invention also contemplates other filter cartridges of polygonal shape for compactly fitting within vessel 18. One such filter cartridge has a transverse cross-sectional shape similar to that illustrated in FIG. 9 such that at least three sides 106,108, 110 are disposed at acute angles to each other. These filter cartridges could be disposed in vessel 18 as indicated in FIG. 2 with their sides 110 facing inner surface 22. All of the above-described filter cartridges are intended to be replaceable. Other cartridges can have pentagonal, hexagonal, octagonal, and other geometric shapes.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is

1. A fluid filter apparatus comprising:
    a vessel having a generally cylindrical inner surface and a longitudinal axis, an inlet for receiving therethrough a fluid to be filtered, and means defining an outlet for discharging therethrough a filtered liquid,
    a filter cartridge assembly for filtering a fluid and comprising a plurality of individually replaceable filter cartridges disposed in said filter vessel,
    each said replaceable filter cartridge comprising an elongate permeable filter medium including means defining a passage therein in communication with said vessel outlet, said filter medium remaining in an essentially constant configuration throughout the filtering process, a porous support member being in supporting relationship with said elongate permeable medium, and a pair of end caps secured to respective opposite ends of said elongate permeable filter medium, one of said end caps being sealingly disposed between said filter medium and said vessel outlet and having means defining an opening in communication with said filter medium passage and said vessel outlet, said elongate permeable filter medium having a generally triangularly shaped outer peripheral surface having three substantially flat elongate sides, adjacent ones of the elongate sides being joined by an arcuate portion so that each triangularly shaped filter cartridge has rounded corners,
    at least some of said filter cartridges being arranged in a generally circular pattern around the inner cylindrical surface of the vessel such that a flat side of each of said cartridges in the circular pattern is in direct facing relationship with said vessel inner surface and an opposite rounded corner of the cartridge faces radially inward toward the longitudinal axis of said vessel, adjacent flat sides of adjacent cartridges in the circular pattern generally facing each other, whereby the filter cartridges are closely spaced within said vessel thereby increasing filtration capacity.

2. The apparatus of claim 1 wherein said support member is thin-walled and disposed in said filter medium passage in supporting engagement with the inner surface thereof.

3. The apparatus of claim 2 wherein said passage and said support member have generally triangularly shaped transverse cross-sections.

4. The apparatus of claim 3 wherein said end caps are generally triangularly shaped and said opening in said one end cap is generally triangularly shaped.

5. The apparatus of claim 2 wherein said passage and said support member have generally circularly shaped transverse cross-sections.

6. The apparatus of claim 5 wherein said end caps are generally triangularly shaped and said opening in said one end cap is generally circularly shaped.

7. The apparatus of claim 1 wherein said passage and said support member have generally triangularly shaped transverse cross-sections, and
    wherein said one end cap includes a pair of generally triangularly shaped flange members extending outwardly therefrom, said flange members having the ends of said filter medium and said support member sealingly secured therebetween.

8. The apparatus of claim 7 wherein said support member is thin-walled and disposed in said passage in supporting relationship therewith.

9. The apparatus of claim 7 wherein said support member is disposed in supporting relation with said outer peripheral surface of said filter medium.

10. The apparatus of claim 1 wherein said support member is disposed in supporting engagement with said outer peripheral surface of said filter medium.

11. The apparatus of claim 1 wherein said support member is disposed in said passage, said support member and said passage having generally circularly shaped transverse cross-sections, and
    wherein said one end cap includes a pair of flange members extending outwardly therefrom, one of said flange members generally encompassing the other said flange member and being generally triangularly shaped, said other flange member being generally circularly shaped, said flange members having the ends of said filter medium and said support member sealingly secured therebetween.

12. The filter apparatus of claim 1 wherein said opposite rounded corners are spaced inwardly from the longitudinal axis of said vessel to define a central space, and including at least one additional filter cartridge in said central space.

* * * * *